(12) United States Patent
Barik et al.

(10) Patent No.: US 8,452,652 B2
(45) Date of Patent: May 28, 2013

(54) ELECTRONIC COUPONS DECISION SUPPORT AND RECOMMENDATION SYSTEM

(75) Inventors: Rajkishore Barik, New Delhi (IN); Parul A Mittal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 2563 days.

(21) Appl. No.: 09/772,244

(22) Filed: Jan. 29, 2001

(65) Prior Publication Data
US 2002/0143612 A1 Oct. 3, 2002

(51) Int. Cl.
*G06Q 30/00* (2006.01)
(52) U.S. Cl.
USPC .......... 705/14.23; 705/14.39; 705/14.51
(58) Field of Classification Search
USPC ............... 705/14.23, 14.39, 14.51
See application file for complete search history.

(56) References Cited

U.S. PATENT DOCUMENTS

| | | | |
|---|---|---|---|
| 4,446,528 A * | 5/1984 | Marmon | 708/132 |
| 5,845,259 A | 12/1998 | West et al. | |
| 6,932,270 B1 * | 8/2005 | Fajkowski | 235/383 |
| 7,013,286 B1 * | 3/2006 | Aggarwal et al. | 705/14 |
| 2002/0013728 A1 * | 1/2002 | Wilkman | 705/14 |
| 2002/0062249 A1 * | 5/2002 | Iannacci | 705/14 |
| 2002/0107738 A1 * | 8/2002 | Beach et al. | 705/14 |

OTHER PUBLICATIONS

U.S. Appl. No. 60/220,637, filed Jul. 25, 2000 by Wilkman and referenced by PGPUB 2002/0013728.*

* cited by examiner

*Primary Examiner* — Michael Bekerman
(74) *Attorney, Agent, or Firm* — Gibb & Riley, LLC

(57) ABSTRACT

A method, an apparatus, and a computer program product for determining a combination of electronic coupons (e-coupons) for redemption by a retailer in a networked environment are disclosed. In the method, a check is made to determine if a selection of e-coupons complies with redeeming conditions for a purchase. If so, a further check is made to determine if two or more of the selected e-coupons are mutually exclusive. The selection of e-coupons complying with the redeeming conditions and being non-mutually exclusive is displayed. Preferably, the method includes suggesting to a user of an optimal or near optimal selection of e-coupons. The e-coupons may reside at a user's site, a third party's site, or a site of the retailer in the networked environment. The networked environment may be the Internet, an Intranet, an Extranet, a local area network, an ATM network, a wide area network and a wireless network.

36 Claims, 11 Drawing Sheets

ELECTRONIC COUPONS DECISION SUPPORT AND RECOMMENDATION SYSTEM

FIELD OF INVENTION

The invention relates generally to electronic commerce (e-commerce) in a networked environment and particularly the use of electronic coupons (e-coupons) in e-commerce systems.

BACKGROUND

Various sales promotion mechanisms exist including prizes, contests, sweepstakes, games, free samples, product warranties, tie-in promotions, loyalty points, cross-sell, up-sell, premium, memberships, card discounts and gift certificates. These mechanisms have been used for a long time to retain loyal customers, to increase the repurchase rate of occasional customers, to attract new buyers, to manage inventory and to gain market. Such mechanisms and others (e.g., instant discount, which is similar to haggling or negotiations in the real world) are referred to hereinafter as coupons.

In particular, coupons have been used as a sales promotion tool in the physical shopping world. A shopper usually has several coupons that can be used for a given purchase and needs to decide the subset of coupons to be redeemed for the purchase. Several factors make this decision a nontrivial task for the shopper. Often, coupons have mutual exclusivity constraints that restrict their use with other coupons. For example, the constraint may be that a coupon cannot be applied with any other discounts on a particular item.

With the advent of Internet shopping, the electronic equivalents of "coupons" have come into existence. There are three types of models: (1) coupons that are issued at an e-commerce site and redeemed at a physical store, (2) those issued and redeemed at a single e-commerce site, and (3) others that are issued at one e-commerce site and redeemed at another e-commerce site. The most general electronic coupon generation, presentation, redemption and clearing system allows a consumer to collect electronic coupons while doing online shopping, or otherwise visiting an e-commerce site, from various e-commerce sites and redeem these coupons online at any e-commerce site or physical store, satisfying the purchase conditions of the offer. The clearing between the issuing and redeeming e-commerce sites is also electronic, whether off-line or online. The issuing e-commerce site is commonly referred to as the manufacturer and the redeeming e-commerce site is referred to as the retailer.

A shopper can browse through a number of e-commerce sites and collect a large number of electronic coupons distributed via e-mails, banner advertisements on various sites, buying online, and the like. The number of electronic coupons that a shopper may have can be 10 or more, at any point of time, since the cost of issuing an electronic coupon is minimal. Electronic coupons make life easier for the shopper because the person does not have to cut, clip and carry paper coupons. However, the selection of electronic coupons to get the optimum discount is not straight forward.

The electronic, coupons may also have a plurality of discount types such as monetary, loyalty points, freebies, and the like. The task of deciding the optimal subset of coupons, along various optimization parameters such as number of points awarded, freebies offered, discount amount and expiry date, subject to mutual exclusivity constraints is a hard problem for the shopper. This problem is referred to as the "electronic coupon decision problem".

U.S. Pat. No. 5,845,259, issued to West et al. on Dec. 1, 1998, describes an electronic coupon dispensing system to increase the rate of coupon redemption. The system includes a memory for electronically storing a plurality of coupons, one or more user interfaces for permitting selection of any of the coupons from a coupon menu, and one or more printers for printing coupons elected at the user interface. The system provides an in-store coupon dispensing system that dispenses coupons based on consumer-made coupon menu selections. The system is said to generate coupons with any expiration date, e.g., daily, weekly, or monthly, based upon each advertiser's specific marketing needs. In addition, the coupon dispensing machine may limit the number of coupons dispensed, based upon an initial number or consumer demand, as set by the advertiser. Also, coupons can be disseminated to any level, e.g., by geographic region, city, chain, store, or any defined set of stores within one or more geographic region, city or chain.

This system is said to permit a store to suspend dispensing of a particular coupon or coupons based on inventory status or other individual store conditions. Further, the system is said to permit a store to respond quickly to ever-changing consumer buying trends, in that a coupon for a particular product or products may be added to, deleted, or temporarily suspended from the system menu through software-implemented changes on a same-day basis. However, this system disadvantageously generates coupons based on a shopper's selection and an advertiser's preferences. A shopper is not allowed to choose among the shopper's existing coupons. Further, the system disadvantageously does not provide any intelligent product recommendations that allow a shopper to use more coupons. Also, the system is limited to physical stores and printed coupons.

Existing systems do not assist a shopper in a simple selection of electronic coupons for use in an online or an off-line purchase. Further, such systems fail to provide intelligent suggestions and automated, near-optimal or optimal combination computations along shopper specified optimization parameters.

Thus, using conventional approaches, a shopper often experiences difficulty in determining what additional coupons can be used by the purchase of another product(s). Nonetheless, the purchase of one more product may likely satisfy the conditions of a coupon that gives a huge discount to the shopper, however, the shopper may not be able to determine this. Thus, a need clearly exists for an improved system for facilitating the use of combinations of electronic coupons.

SUMMARY

In accordance with a first aspect of the invention, a method of determining a combination of electronic coupons (e-coupons) for redemption by a retailer in a networked environment is disclosed. In the method, a check is made to determine if a selection of e-coupons complies with redeeming conditions in relation to a purchase. The selection of e-coupons complying with the redeeming conditions is checked to determine if two or more of the e-coupons are mutually exclusive. The selection of e-coupons complying with the redeeming conditions and being non-mutually exclusive is displayed.

Preferably, the method includes the step of selecting by a user the selection of e-coupons from a plurality of e-coupons.

Preferably, the method includes the step of providing a suggestion to a user of an optimal or near optimal selection of e-coupons.

Preferably, the method includes the step of providing a recommendation to a user regarding an additional purchase enabling the user to avail of more discounts.

The e-coupons may reside at a user's site, a third party's site, or a site of the retailer in the networked environment.

Optionally, the displayed selection of e-coupons is dependent upon optimization parameters.

The networked environment may be implemented utilizing the Internet, an Intranet, an Extranet, a local area network, an ATM network, a wide area network or a wireless network.

In accordance with a second aspect of the invention, an apparatus for determining a combination of electronic coupons (ecoupons) for redemption by a retailer in a networked environment is disclosed. The apparatus includes a device for determining if a selection of e-coupons complies with redeeming conditions in relation to a purchase; a device for checking the selection of e-coupons complying with the redeeming conditions to determine if two or more of the e-coupons are mutually exclusive; and a device for displaying the selection of e-coupons complying with the redeeming conditions and being non-mutually exclusive.

In accordance with a third aspect of the invention, a computer program product having a computer readable medium having a computer program recorded therein for determining a combination of electronic coupons (ecoupons) for redemption by a retailer in a networked environment is disclosed. The computer program product includes:

a computer program code module for determining if a selection of e-coupons complies with redeeming conditions in relation to a purchase;

a computer program code module for checking the selection of e-coupons complying with the redeeming conditions to determine if two or more of the e-coupons are mutually exclusive; and a computer program code module for displaying the selection of e-coupons complying with the redeeming conditions and being non-mutually exclusive.

In accordance with a fourth aspect of the invention, a method for electronic coupon (e-coupon) decision support is disclosed. In the method, a set of applicable e-coupons is computed dependent upon a set of e-coupons of a user. A check is made to determine if the computed set of e-coupons complies with one or more redeeming conditions and is not mutually exclusive. The computed set of e-coupons determined to comply with the redeeming conditions and not being mutually exclusive is displayed.

Preferably, the computing step is also dependent upon order information.

Preferably, the method includes the steps of, if the computed set of e-coupons contains at least one e-coupon failing to comply with the redeeming conditions: displaying the computed set of e-coupons; and enabling the user to select another set of e-coupons for use in the computing step. Optionally, exclusive coupons in the another selected set of e-coupons to the user are displayed. Still further, the method may include the step of displaying coupons in the another selected set of e-coupons that are exclusive and fail to comply with the redeeming conditions to the user.

Preferably, the method includes the step of processing a purchase order for the displayed, computed set of e-coupons determined to comply with the redeeming conditions and not being mutually exclusive.

Preferably, the method further includes the step of saving the displayed, computed set of e-coupons determined to comply with the redeeming conditions and not being mutually exclusive and choosing another subset of the e-coupons.

Preferably, the method includes the step of recommending to the user a set of e-coupons determined to comply with the redeeming conditions and not being mutually exclusive.

Preferably, the method includes the step of finding an optimal set of e-coupons dependent upon optimization parameters. The finding step may be implemented using an optimization engine, the optimization engine addressing one or more conditions selected from the group consisting of: an AND condition among product purchase redemption conditions; an XOR condition among product purchase redemption conditions; a coupon purchase condition on total amount; and coupons with heterogeneous purchase conditions.

Preferably, the method includes the step of providing recommendations to the user in relation to a user selected set of e-coupons.

The e-coupons may reside at any one of the group consisting of a user's site, a third party's site, and a site of the retailer in the networked environment.

In accordance with a fifth aspect of the invention, an apparatus for electronic coupon (e-coupon) decision support is disclosed. The apparatus includes: a device for computing a set of applicable e-coupons dependent upon a set of e-coupons of a user; a device for determining if the computed set of e-coupons complies with one or more redeeming conditions and is not mutually exclusive; and a device for displaying the computed set of e-coupons determined to comply with the redeeming conditions and not being mutually exclusive.

In accordance with a sixth aspect of the invention, a computer program product having a computer readable medium having a computer program recorded therein for electronic coupon (e-coupon) decision support is disclosed. The computer program product includes: a computer program product module for computing a set of applicable e-coupons dependent upon a set of e-coupons of a user; a computer program product module for determining if the computed set of e-coupons complies with one or more redeeming conditions and is not mutually exclusive; and a computer program product module for displaying the computed set of e-coupons determined to comply with the redeeming conditions and not being mutually exclusive.

BRIEF DESCRIPTION OF THE DRAWINGS

A small number of embodiments are described hereinafter with reference to the drawings, in which.

DETAILED DESCRIPTION

Figure 1:
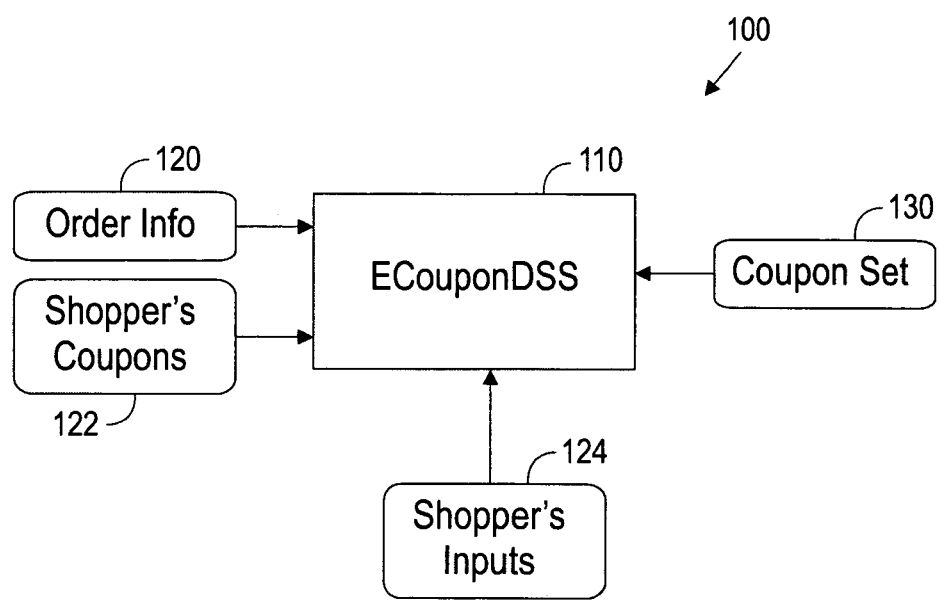
FIG. 1 is a block diagram illustrating an interactive, online, coupon decision support system in accordance with a first embodiment of the invention.

A method, an apparatus, and a computer program product are disclosed for determining combinations of electronic coupons (e-coupons) and preferably providing suggestions or recommendations about those combinations to one or more users. In the following description, numerous details are set forth including particular types of coupons, networks to be employed, and the like. It will be apparent to one skilled in the art, however, that the present invention may be practised without these specific details. In other instances, well-known features are not described in detail so as not to obscure the present invention. For ease of description, the embodiments of the invention are referred to simply as a e-coupon decision support and recommendation system.

In the following description, components of the e-coupon decision support (ECouponDSS) and recommendation system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

1. Overview

The embodiments of the invention provide a process, an apparatus and a computer program product for an electronic coupon decision support and recommendation system. In particular, a process is described to assist a shopper in choosing a subset of coupons, for use in a given purchase, from a number of coupons available to the shopper. The process aims to provide an enhanced coupon-using experience and a user-friendly coupon management system. The process also provides intelligent coupon usage suggestions or recommendations based on optimal or near optimal coupon subsets.

The solution provided by the embodiments of the invention does so along various optimization parameters, such as loyalty points, freebies, discount amount, number of coupons redeemed, and the like. The method also preferably provides coupon usage and savings reports to the customers and allows the customers to compare various coupon selections. Still further, the method gives intelligent recommendations to the shopper about additional purchases that avail the shopper of more discounts. The method can be applied to the electronic coupons that are used for on-line as well as off-line shopping. The coupons can be resident either in the shopper's desktop, a third party wallet service provider, or on the retailer's site. The method allows customers to compare various coupon selections. The method can be carried out by a system resident either at the shopper's desktop as an independent application, as a plugin to a browser, or at a third party service provider or retailer's site.

The system preferably has three main parts: an ECouponDSS system or module, an Optimization Engine and a Recommendation Engine. However, the ECoupon DSS system or module can be practiced without the latter two. The system may be implemented using specialized hardware, or software running on a generic or specialized hardware.

2. ECoutponDSS Module

The ECouponDSS module is an interactive, online coupon decision support system to help a shopper decide the subset of coupons to use profitably for a given purchase. The ECouponDSS system 100 according to a first embodiment shown in FIG. 1 includes an ECouponDSS module 110. Shopper's coupons 122 and information about the items being purchased (referred to as the order info) 120 are input to the ECoupon DSS module 110. The module 110 also takes inputs 124 from the shopper in an interactive manner and outputs a set of coupons 130 to be redeemed in a given purchase. The shopper's coupons 122 and the order info 120 are described hereinafter in greater detail.

a. The Shopper's Coupons 122 refer to electronic coupons belonging to the shopper. The shopper collects such coupons through various electronic coupon distribution media, e.g., the shopper can receive a link to an electronic coupon in an e-mail, as an advertisement on various online sites, and the like. The shopper may click on the link to save the electronic coupon, which may be saved on the shopper's desktop, a third party coupon wallet service provider, or with the store offering the coupons, for example. A general e-coupon includes redemption conditions, discount conditions and mutual exclusivity rules:

(i) Redemption conditions are requirements that must be satisfied by a purchase order for the e-coupon to be applicable. Examples of redemption condition are a product purchase condition (say, buy x units of a particular product), a category purchase condition (buy x units of any products belonging to a category with a price more than $y), an order purchase condition (the total order value should be greater than $y), a payment method purchase condition (buy using a VISA credit card), shopper specific condition (name or address of the shopper), and the like.

(ii) Discount conditions describe a discount that is offered once all the redemption conditions are satisfied. Examples of discount conditions are a fixed unit discount ($5 off per unit of product/category), fixed total discount ($10 off on the total purchase), percentage discount (20% off for a product/category/order), loyalty points towards a membership, and the like.

(iii) Mutual exclusivity means that an e-coupon cannot be used in conjunction with another mutually exclusive coupon (i.e., in the same purchase). Examples of mutual exclusivity rules among various coupons are only one order discount coupon per order, only one coupon can be redeemed per product in a purchase, a product cannot be used to satisfy redemption conditions of more than one coupon, and the like.

b. The Order Info 120 refers to the information about items being purchased in a given purchase, such as the name of the item, the unique identification of the item (e.g., a Universal Product Code (UPC)), the quantity of item being bought, price per unit of the item being bought, categories that the product belongs to, payment method, shopper specific information such as the shopper's name, address, and the like.

Preferably, the ECouponDSS module 110 initially displays a Shopper's Coupon 122 to a shopper. The shopper selects the set of e-coupons that the shopper wants to redeem. The system 100 then determines if the coupons are applicable to the given set of items in the order information 120 by checking the redemption conditions. Among the coupons that satisfy the redemption conditions for the given order information, the ECouponDSS module 110 checks if the coupons are mutually exclusive. If the shopper's selected set of coupons is applicable and not mutually exclusive (i.e., the coupons can be used for the current purchase), the system displays the set of applicable coupons 130 and the corresponding discount amount. The shopper can either use the selected set of coupons 130 and further process the order, or choose to select another combination of coupons and save the current combination for future comparison. If the shopper's selected coupons 130 cannot be used, the system queries the shopper to select another set of coupons. The process continues until the shopper selects and chooses to use a set of non-mutually exclusive coupons 130.

Figure 2:
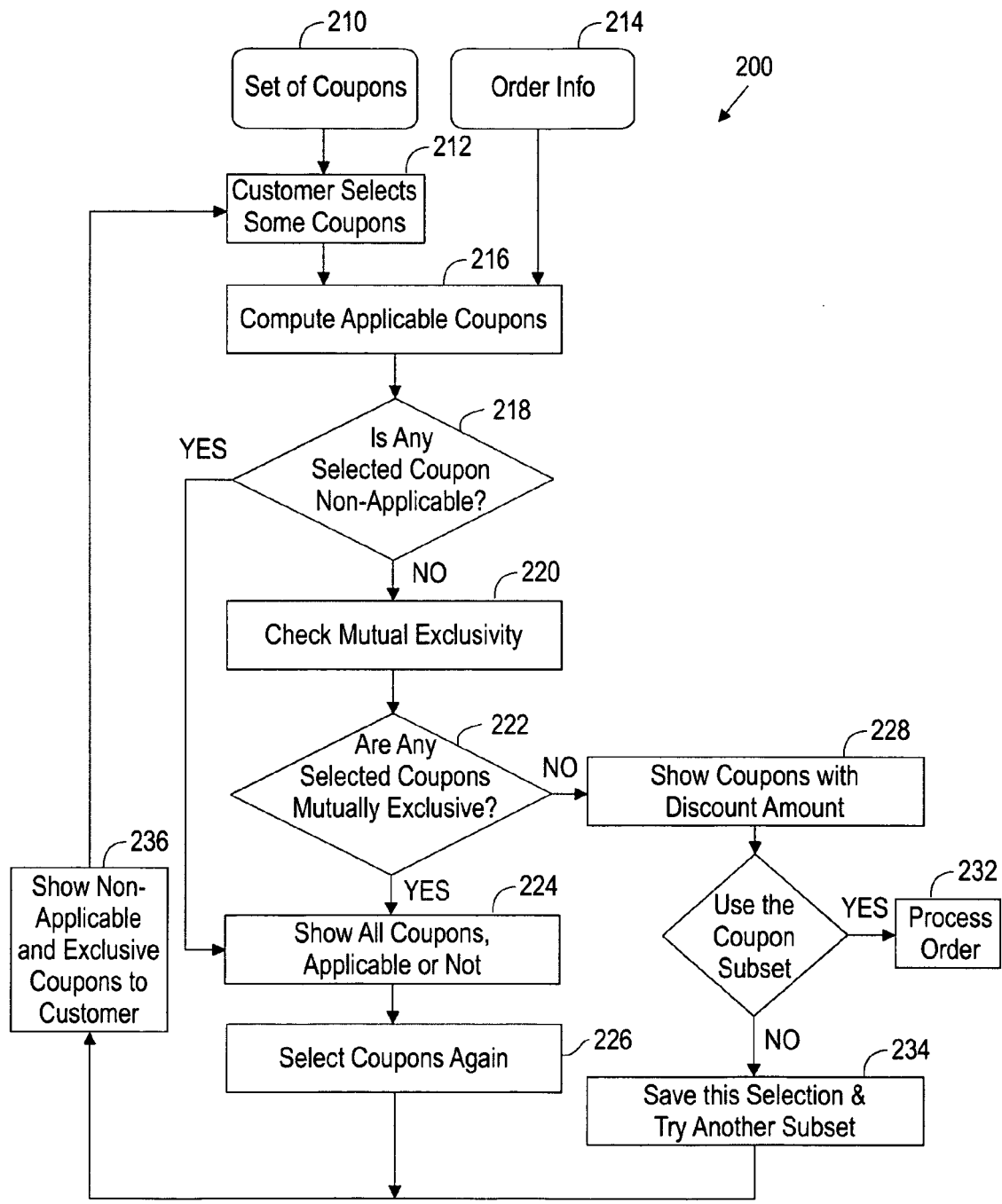
FIG. 2 is a flow diagram illustrating the processing of the decision support system of FIG. 1.

FIG. 2 is a flows diagram illustrating operation of the ECouponDSS module 110 of FIG. 1 in detail. The process 200 commences in step 212. In step 212, the customer selects some coupons from the set of coupons 210 that is provided as input (corresponding to shopper's coupons 122 of FIG. 1). Processing then continues at step 216. In step 216, the module computes the applicable coupons. This step 216 receives as input the order info 214 (corresponding to order info 120 of FIG. 1).

In decision block 218, a check is made to determine if any of the selected coupons are not applicable. If decision block 218 returns true (Yes), processing continues at step 224. Otherwise, if decision block 218 returns false (No), processing continues at step 220. In step 220, a mutual exclusivity check is performed on the selected coupons. Processing then continues at decision block 222.

In decision block 222, a check is made to determine if any selected coupons are mutually exclusive. If decision block 222 returns true (Yes), processing continues at step 224. In step 224, all selected coupons are shown or displayed, whether applicable or not. In step 226, the user again selects the coupons. Processing continues at step 236. In step 236, non-applicable and exclusive coupons are shown to the user. Processing then continues at step 212.

Otherwise, if decision block 222 returns false (No), processing continues at step 228. In step 228, the coupons are shown with relevant discount amounts. In decision block 230, a check is made to determine if the coupons subset can be used. If decision block 230 returns true (Yes), the order is processed in step 232. Otherwise, if decision block 230 returns false (No), processing continues in step 234. In step 234, the current selection is saved and another subset of coupons is tried for further processing. Processing then continues at step 236.

Optionally, the ECouponDSS system 100 initially shows the coupons based on their increasing expiry date (i.e., top 10 coupons based on expiry date) per process 200 of FIG. 2. The system 100 attempts to help the shopper make use of the coupons that are about to expire earlier. The shopper then selects the set of coupons that the shopper wants to redeem. The process of FIG. 2 is otherwise the same, except for the noted modification made to steps 210 and 224.

In summary, the ECouponDSS system 160 in operation (per FIG. 2) determines the subset of applicable coupons from the set of available coupons. The ECouponDSS module 110 verifies the redemption conditions for the given order info. Then the module 110 shows a list of all the applicable coupons to the customer and the items required to satisfy the conditions for each coupon and the discount that can be availed from the coupon. The customer then selects from the applicable coupons the combination of coupon(s) to use for a particular purchase order. The system 100 determines if the chosen coupons are mutually exclusive or not. If the selected coupons are not mutually exclusive, the system 100 shows the discounted amounts and the total money to be paid. From this point, the customer can process the order as in the usual case or choose to select another combination and save the current selection before trying another combination. If the selected coupons are mutually exclusive, the system asks the shopper to select another set of coupons. The process continues until the shopper selects and chooses to use a set of non-mutually exclusive coupons.

Figure 3:
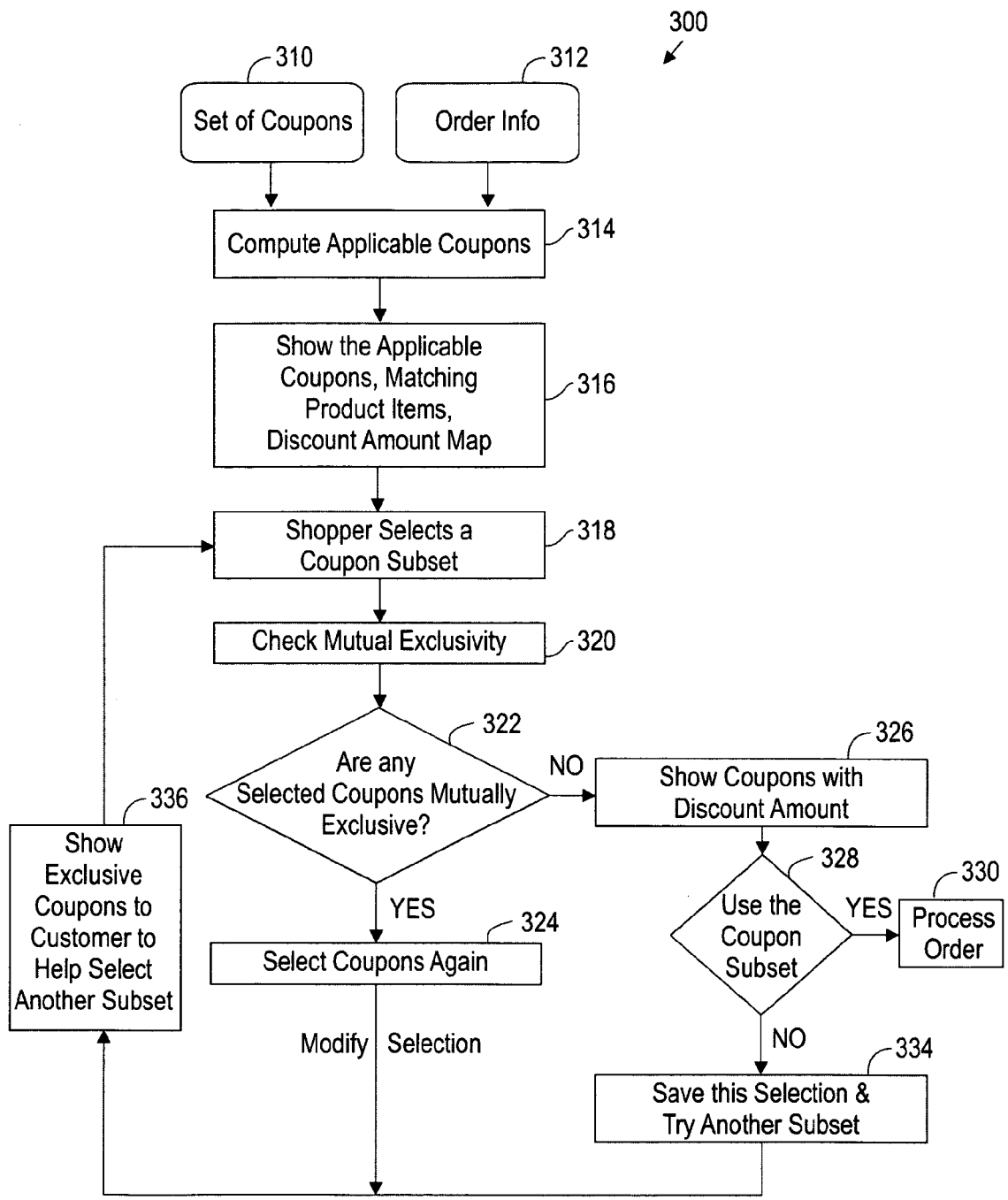
FIG. 3 is a flow diagram illustrating the processing of the decision support system of FIG. 1 in accordance with a second embodiment of the invention.

FIG. 3 is a flows diagram illustrating a process of operation of the ECouponDSS module 110 of FIG. 1 in accordance with a second embodiment of the invention. The process 300 of FIG. 3 commences in step 314. A set of coupons 310 and order info 312 (corresponding to like elements 122 and 120 of FIG. 1) are provided as input at step 314. In step 314 the applicable coupons are computed. In step 316, the applicable coupons, matching product items, and discount amount map are shown to the user.

In step 318, the shopper selects a coupon subset. In step 320, the module checks the mutual exclusivity of the coupon set. In decision block 322, a check is made to determine if any of the selected coupons are mutually exclusive. If decision block 322 returns true (Yes), processing continues in step 324. In step 324, the user or shopper selects the coupons again (i.e., modifies the selection). Processing then continues at step 336. In step 336, exclusive coupons are shown to the customer to help select another subset. Processing then continues at step 318.

Otherwise, if decision block 322 returns false (No), processing continues at step 326. In step 326, coupons are shown or displayed to the shopper with discount amounts. Processing then continues in decision block 328. In decision block 328, a check is made to determine if the coupon subset can be used. If decision block 328 returns true (Yes), the order is processed in step 330. Otherwise, if decision block 328 returns false (No), processing continues in step 334. In step 334, the current selection is saved and another subset is tried or attempted. Processing then continues at step 336.

Preferably in this embodiment, the ECouponDSS module 110 takes shopper's preferences 124 as inputs in determining the set of coupons to display to the shopper. Examples of such preferences are the set of "Must include" and "Must not include" products (categories) with respect to an individual shopper. Only coupons having "Must Include" products (categories) are considered for further analysis. Shopper's preferences are obtained through any of the following means: demographics information, dynamically prompting the shopper to enter his/her interests, profiling the shopper's purchase history, and profiling the shopper's click stream, and the like. It will be appreciated those skilled in the art that other techniques of obtaining shopper preferences can be employed in view of this disclosure without departing from the scope and spirit of the invention.

Preferably, the ECouponDSS system 100 allows the shopper to compare previously saved coupon subsets. The shopper can compare the saved coupon subsets and choose a subset for use in current purchase.

More preferably, the comparison of coupon subsets is done along various optimization parameters such as freebies, loyalty points, expiry date and discount amount. The shopper can specify the optimization criteria as a combination of optimization parameters in a weighted function.

Optionally, the ECouponDSS module 110 provides a plurality of statistical reports to the shopper regarding the coupons redeemed and the amount of money saved during a specified time period.

3. Optimization Engine

Figure 4:
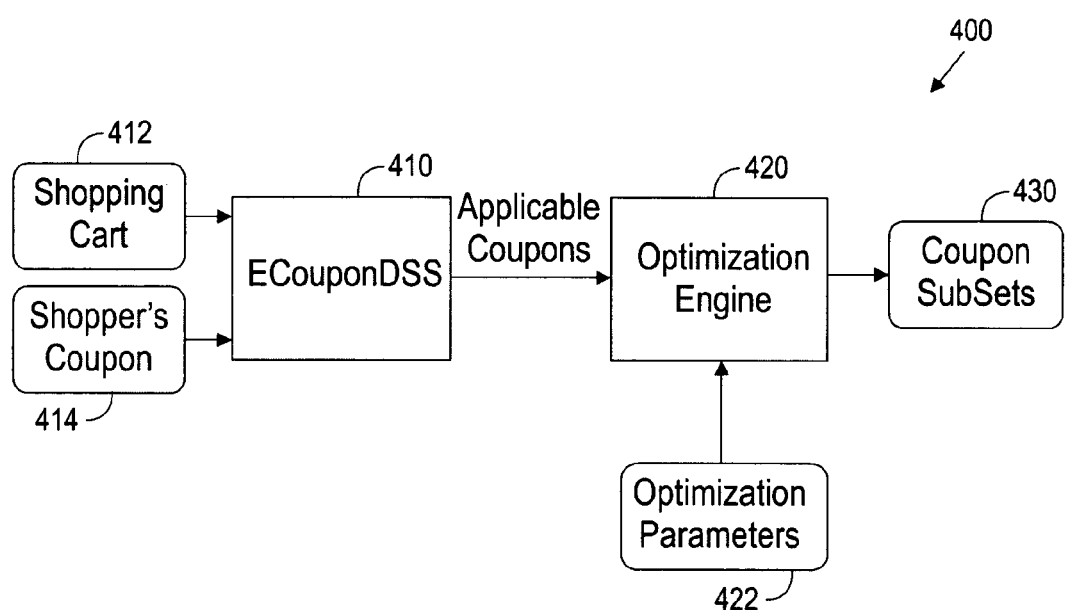
FIG. 4 is a block diagram illustrating an online coupon decision support system having an optimization engine in accordance with a third embodiment of the invention.

FIG. 4 is a block diagram illustrating a system 400 in accordance with a third embodiment of the invention. The system 400 includes an automated optimization engine 420 used with the ECouponDSS module 410. The ECouponDSS module 410 receives as input a shopping cart 412 and shopper's coupons 414. The ECouponDSS module 410 outputs applicable coupons to an optimization engine 420. Also, the optimization engine 420 has as input optimization parameters 422. The optimization engine 420 produces the coupon subsets 430.

The shopper may query the system 400 to suggest a most favorable combination of coupons or a close-to-optimal subset(s) of coupons, for the given purchase order. The customer can choose to optimize based on various parameters. These optimization parameters 422 are used by the optimization engine 420 in comparing the possible subsets of coupons that can be used in the given purchase order. Examples of optimization parameters 422 are the discount amount of the selected coupon set should be maximized, the loyalty points towards a membership should be more than x, the number of free items in discounts should be highest, a particular coupon(s) should not be included in the selected sets, a particular coupon(s) should be included in the selected sets, coupons with earlier expiry time be given higher preference, maximum number of coupons should be used, and the like.

The system 400 first calculates applicable coupons based on the redemption conditions. The system 400 then computes the global optimum or a set of close to optimum solutions, whichever is possible, based on the optimization criteria 422 specified by the shopper and the coupons mutual exclusivity rules. The shopper selects one of the combinations suggested by the system 400 and proceeds to process the order.

Given the order information and the set of coupons available to the shopper, finding an optimal set of coupons, along various optimization parameters, subject to mutual exclusivity constraints, is a computationally intractable problem for a large number of coupons. The optimization engine 420 can use one or more of existing heuristics, integer linear programming model, or genetic algorithm approaches to solve these problems. Some examples of the coupon redemption conditions and how the optimization problem reduces to known intractable problems are described hereinafter.

a. AND condition among product purchase redemption condition

The AND condition among products means that the coupon can be redeemed if and only if the shopper has all the products present in the shopper's purchase order. Added to this condition is the mutual exclusivity rule that only one coupon can be applied to a product. Assuming that a set of coupons have redemption conditions P1, P2, . . . , Pn on products, a conflict graph can be constructed with nodes representing the purchase condition P1, P2, . . . , Pn. The edges in the conflict graph represent exclusivity conflicts among the redemption conditions (i.e., an edge between P1 and P2 implies that P1 and P2 have at least one product in common). An example of four such coupons is shown in Table 1.

TABLE 1

| Coupon | Redemption Condition | Discount in $ |
|--------|---------------------|---------------|
| P1     | A                   | 5             |
| P2     | ABC                 | 15            |
| P3     | C                   | 5             |
| P4     | AC                  | 12            |

Figure 5:
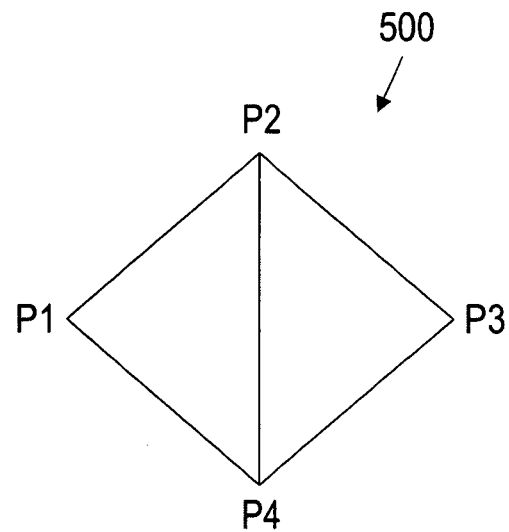
FIG. 5 is a conflict graph for four coupons.

The corresponding conflict graph 500 is shown in FIG. 5. None of the coupons can be redeemed at the same time. Each node in the graph is associated with a weight or a score, based on the optimization criteria. The problem of finding an optimal set of coupons reduces to finding weighted maximal independent set in the conflict graph.

b. XOR condition among product purchase redemption conditions

The XOR condition among products means that a coupon can be redeemed if and only if one of the products from the coupon redemption condition is present in the shopper's purchase order. Added to this condition is the mutual exclusivity rule that only one coupon can be applied to a product.

Figure 6:
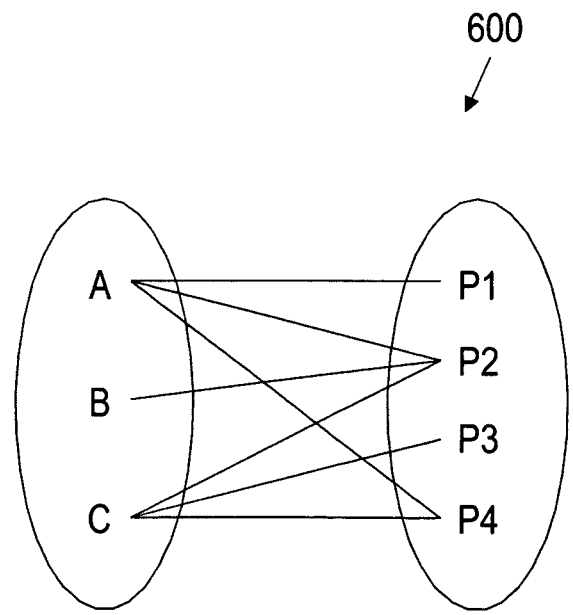
FIG. 6 is a bipartite graph of redemption conditions for various coupons and of various products.

Assuming that a set of coupons have redemption conditions P1, P2, . . . , Pn on products and the set of products is A, B, . . . , C, a bipartite graph 600 shown in FIG. 6 can be constructed with one set: of nodes representing the redemption condition of various coupons and another set of nodes representing various products. An edge between these two sets of nodes represents the applicability of the coupons (i.e., edge between P1 and A implies that redemption condition P1 can be applicable on A). Each node P1, P2, . . . , Pn is associated with a weight based on the optimization criteria. The problem of finding optimal set reduces to finding the weighted maximal matching set in the bipartite graph 600. Table 2 lists examples of relevant coupons.

TABLE 2

| Coupon | Redemption Condition | Discount in $ |
|--------|---------------------|---------------|
| P1     | A                   | 5             |
| P2     | A xor B xor C       | 15            |
| P3     | C                   | 5             |
| P4     | A xor C             | 12            | c. Coupon purchase condition on total amount

In some cases, a redemption condition in the coupon may state that if the shopper has bought products (categories) worth a specified amount ($100, for example), the shopper is given a discount (e.g., $20). The redemption amount for all the coupons is $A1, A2, \ldots, An$, and their corresponding discount amount is $d1, d2, \ldots, dn$. Let the shopper's current purchase amount be P. The problem of finding an optimal set reduces to finding a subset of the Ai's having a sum that is less than or equal to P. This problem is exactly similar to the well known 0/1-knapsack problem.

d. Coupons with heterogeneous purchase conditions

The three cases, (a-c) discussed hereinbefore consider that shopper's coupons are homogeneous in nature, (i.e., they have a uniform purchase condition either on AND, XOR, or amount). In a more practical scenario, the coupons can be heterogeneous. To obtain a near optimal solution in this case, a conflict graph may be constructed. Each node in the conflict graph is associated with a weight and an amount. The nodes for various purchase conditions are constructed as follows:

1) If the coupon has purchase conditions on AND, a single node is created for that coupon and a weight is assigned to that node based on customer evaluation, discount, etc. The amount associated with this node is the sum of the prices of the individual items appearing in the AND purchase condition.
2) If the coupon has purchase conditions on XOR, different nodes are created for each sub-component of the XOR purchase condition (i.e., the purchase condition C xor D xor E leads to three different nodes C, D and E in the conflict graph with either the same or different weights). If a node for any of the sub-components already exists, a new node is not created but the weight is modified to the maximum of the two. The principle is to keep all those nodes that each have maximal weight associated with the node. The amount associated with each of these nodes is the price of that item.
3) If the coupon has a purchase condition on amount, a single node is created for that coupon with the associated weight. The amount associated with this node is equal to the amount given in the purchase condition.

For constructing edges in the conflict graph, the following rules are used:

1) The sub-components of the XOR condition form a complete graph among the nodes created for the sub-components. The coupon can only be redeemed if the shopper has bought any one of the sub-components of the XOR purchase condition.
2) An edge between a node created for a coupon with amount as a purchase condition and any other node implies that the sum of amounts associated with both the nodes is greater than the current purchase amount. This implies that both the coupons cannot be redeemed at the same time.
3) Otherwise, an edge between two nodes indicates that a product is in common between the two nodes.

The problem of finding a near optimal set of coupons is thus reduced to finding a maximal weighted independent set problem in the conflict graph. An example consisting of the shopper's shopping cart information and six shopper's coupon is listed in Tables 3 and 4.

TABLE 3

Shopping Cart:

| Items in Shopping Cart | Price in $ |
|---|---|
| A | 10 |
| B | 20 |
| C | 15 |
| D | 10 |
| E | 5 |

TABLE 4

Shoppers Coupons:

| Coupon | Purchase Condition | Discount amount in $ |
|---|---|---|
| 1 | A and B and C | 10 |
| 2 | C xor D xor E | 3 |
| 3 | 50 | 10 |
| 4 | D and E | 5 |
| 5 | 40 | 8 |
| 6 | B xor C | 4 |

Figure 7:
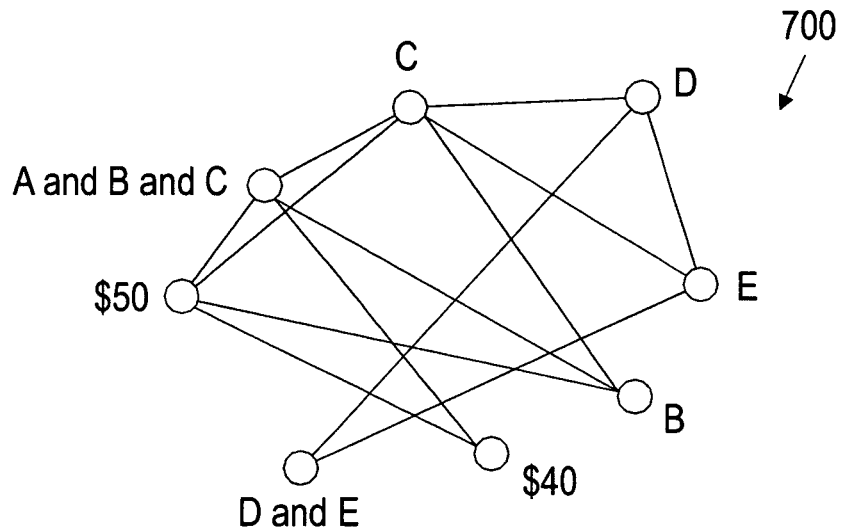
FIG. 7 is a conflict graph of six shopper's coupons.

The corresponding conflict graph 700 for Tables 3 and 4 is shown in FIG. 7.

Preferably, the optimization engine 420 can be configured to use a default optimization criteria in the absence of shopper preferences.

4. Recommendation Engine

Figure 8:
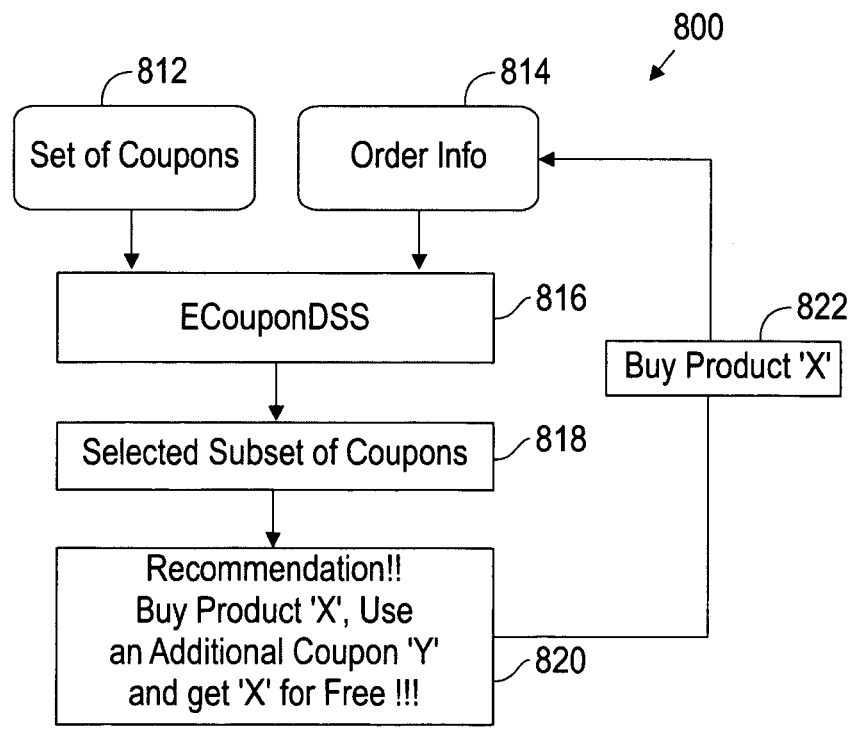
FIG. 8 is a block diagram of an online coupon decision support system in accordance with a fourth embodiment of the invention.

In a fourth embodiment of the invention, the ECouponDSS module 110, 410 can give useful recommendations to a shopper after the user selects a set of coupons to use. These recommendations are for further purchase of a product or category to avail of an existing shopper's coupon. That is, the system can prompt the shopper to buy some products (categories), which allows the shopper to use more coupons as shown in FIG. 8. The process 800 of the fourth embodiment commences in step 816. A set of coupons 812 and order info 814 are provided as input to the ECouponDSS module 816. In step 818 a subset of coupons is selected. In step 820, a recommendation is made to the user, e.g., "Recommendation!! Buy product X, use an additional coupon Y and get X for free!". Processing then continues at step 822. In step 822, the product X is purchased or bought. This then provides output as the order info 814.

Preferably, the recommendations can be given as part of the coupon selection procedure.

Optionally, the product (category) recommended to the shopper depends on the shopper's valuation of that product/category (i.e. a meat product recommendation may not be of relevance to a vegetarian). The shopper's valuation may be judged from the shopper's profile obtained either from the demographics of the shopper, based on the past purchase history, a shopper's click stream, or asking questions from the shopper directly.

More preferably, the Recommendation and the Optimization modules can be a part of the ECouponDSS system 100, 400 helping the customer in selecting the subset of coupons.

Deployment Scenarios

A number of deployment scenarios for the ECouponDSS system 100, 400 the Shopper's Coupons 122, 414 and the Online Retailer (Order Info) 120, shown in FIGS. 1 and 4 are described hereinafter. The ECouponDSS system (as well as the optimization engine and the recommendation engine) can be resident either at the shopper's desktop as an independent application, as a plugin to the browser, at a third party service provider, or at the retailer's site.

Similarly the Shopper's Coupons 122, 414 can be resident at the shopper's desktop hard disk, at a third party service provider, or at the retailer's site. The shopper's desktop may also be a WAP enabled phone, which allows the shopper to access the Internet from a wireless phone. A number of the scenarios arising due to the combinations of location of the ECouponDSS module 110, 410 and the Shopper's Coupons 122, 414 with respect to the online retailer are described hereinafter.

Figure 9:
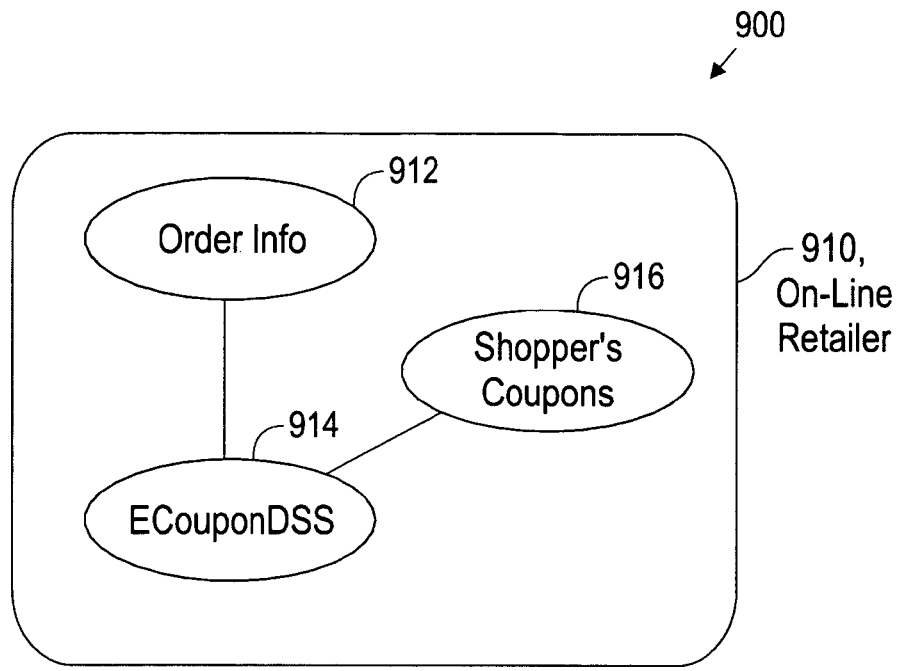
FIG. 9 is a block diagram of a coupon decision support system and shopper's coupons both resident at an online retailer in accordance with the embodiments of the invention.

In yet another (embodiment of the invention, the ECouponDSS module 914 and the Shopper's coupons 916 are both resident at the online retailer 910 as shown in the system 900 of FIG. 9. This is a typical online store coupon scenario where the coupon issuing, storage and redemption are all handled by the same entity. The shopper visits the online retailer site 910, browses the site, shops certain items and chooses to redeem the shopper's coupons 916. The ECouponDSS system 914 interactively assists the shopper in selecting a subset of coupons to use for the current purchase as described hereinbefore. Order info 912 is also resident at the retailer site 910 and input to the ECouponDSS system 914. The shopper redeems the selected subset of coupons 916 and avails of the discounts on the current purchase.

Figure 10:
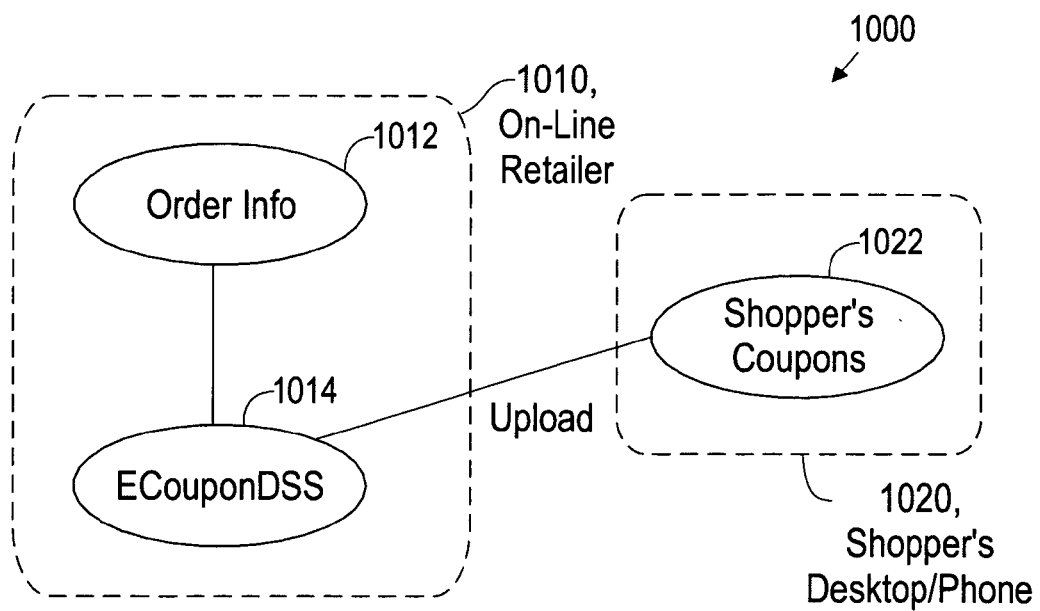
FIG. 10 is a block diagram illustrating an online coupon decision support system located at a retailer's site and shopper's coupons located at a local device in accordance with the embodiments of the invention.

In still a further embodiment of the invention, the ECouponDSS system 1014 and order info 1012 is resident at the on-line retailer's site 1012, but the Shopper's coupons are at the shopper's desktop as shown in the system 1000 of FIG. 10. The shopper visits the online retailer site 1010, browses the site, shops certain items and chooses to redeem the shopper's coupons 1022. The shopper uploads the shopper's coupons 1022 from the desktop 1020 to the retailer's site using the 'File Upload' proposed enhancement to HTML (reference: http://www.ietf.org/rfc/rfc1867.txt). The ECouponDSS system 1014 takes the uploaded set of coupons 1022 as input and interactively assists the shopper in selecting a subset of coupons to use for the current purchase as described hereinbefore. The shopper redeems the selected subset of coupons and avails of the discounts on the current purchase.

Figure 11A:
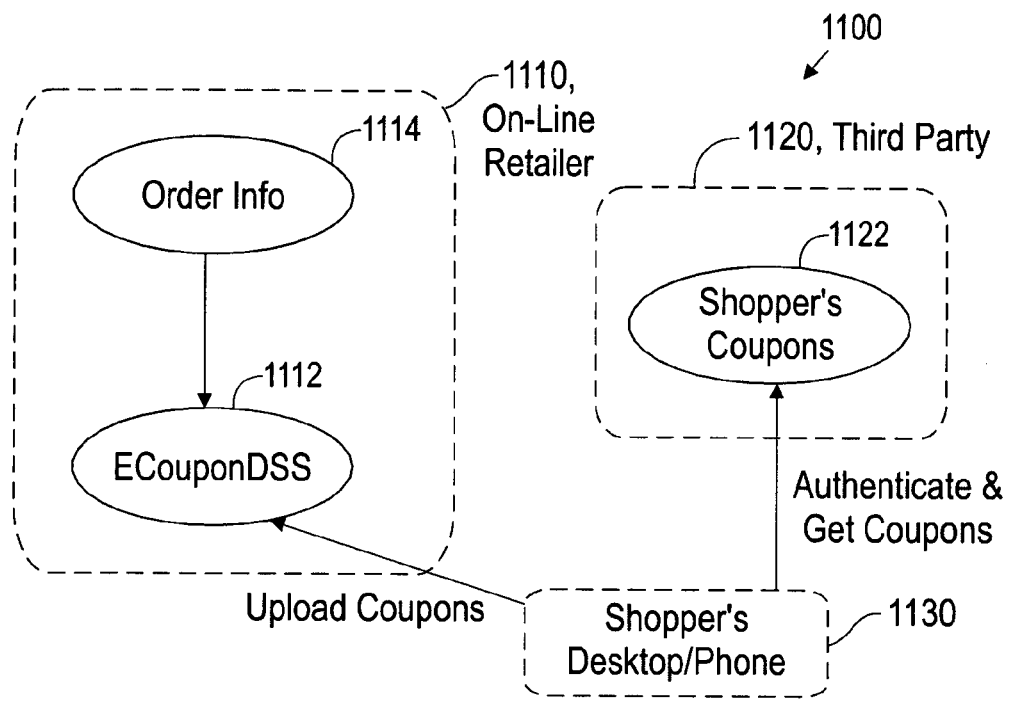
FIG. 11A is a block diagram illustrating an online coupon decision support system resident at a retailer's site and with shopper's coupons located at a third party service provider in accordance with the embodiments of the invention.
Figure 11B:
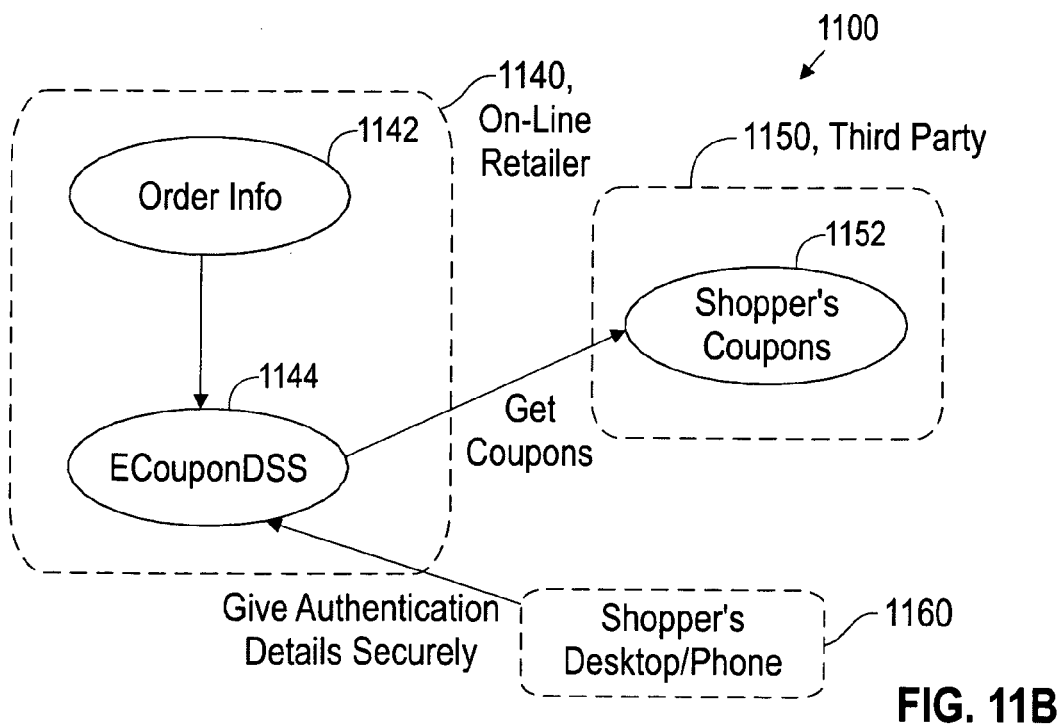
FIG. 11B is a block diagram illustrating an online coupon decision support system resident at a third party service provider and with shopper's coupons located at a retailer's site, a third party service provider, and local device in accordance with the embodiments of the invention.

In yet a further embodiment of the invention, the ECouponDSS module 1112, 1144 is resident at the retailer's site 1110, 1140 but the shopper's coupons 1122, 1152 are at a third party service provider 1122, 1152 as shown in FIGS. 11A and 11B. The retailer 1110, 1140 obtains the shopper's coupons 1122, 1152 from the third party 1120, 1150 at the time of coupon redemption. The ECouponDSS module 1112, 1144 is input order info 1114, 1142. If the third party site 1150, 1120 requires shopper authentication prior to giving the shopper's coupons 1152, 1122 to the retailer 1144, 1122, the shopper 1160, 1130 may either provide the authentication information to the retailer 1140 in a cryptographically secured manner or obtain the coupons 1122 from the third party 1120 and then give the coupons 1122 to the retailer 1110 in an online manner. The latter may be accomplished using the redirection URL directive of HTTP. Thus, in FIG. 11A, the shopper 1130 provides authentication to the third party site 1120 to obtain the shopper's coupons 1122, prior to uploading the coupons 1122 to the ECouponDSS module 1112. In FIG. 11B, the shopper 1160 provides authentication details in a secure manner to the ECouponDSS module 1114, so that the latter can obtain the e-coupons 1152 from the third party site 1150.

Figure 12:
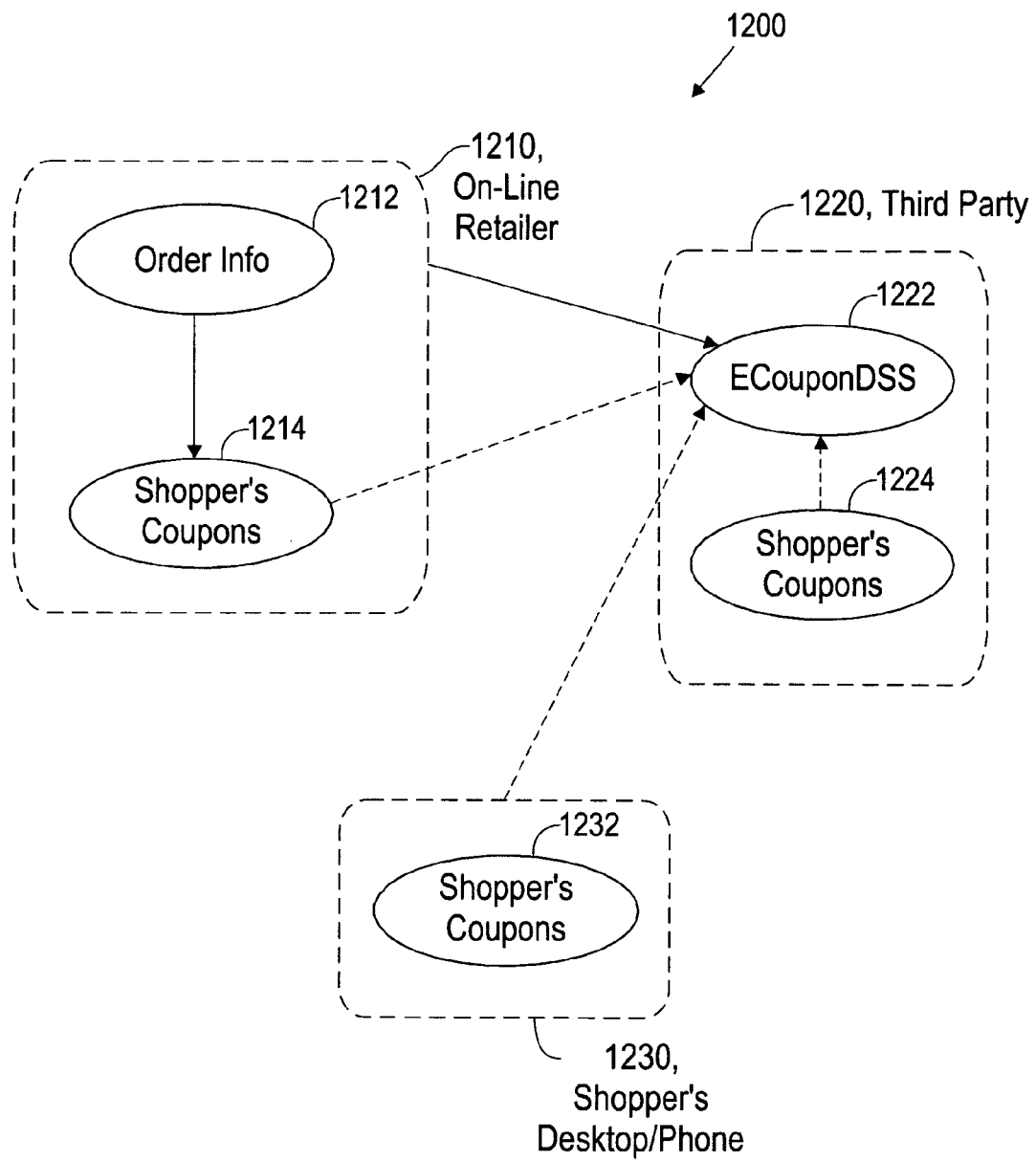
FIG. 12 is a block diagram illustrating an online coupon decision support system located at a third party site and with shopper's coupons located at the retailer's site, the third party site, or a local device in accordance with the embodiments of the invention.

In still another embodiment of the invention, the ECouponDSS module 1222 is resident at a third party site 1220 as shown in FIG. 12. The shopper 1230 visits the online retailer site 1210, browses the site 1210, shops for certain items and chooses to redeem the shopper's coupons 1214*e*. The retailer 1210 sends the order information 1212 to the third party 1220 and redirects the shopper 1230 to the third party site 1220 for coupon selection. If the retailer 1210 has the shopper's coupons 1214, the retailer 1210 also sends the coupons 1214 to the third party 1220. Otherwise, the shopper 1230 uploads the shopper's coupons 1232 to the third party 1220 from a local device, or the shopper's coupons 1224 could be resident at the same third party 1220 as the ECouponDSS module 1222. The ECouponDSS module 1222 takes the shopper's coupons 1214, 1224, 1232 and the order information 1212 as the input and interactively assists the shopper in selecting a subset of coupons to use for the current purchase as described hereinbefore. The ECouponDSS module 1222 returns the final selection of coupons to the retailer 1210 where the shopper 1230 redeems the selected subset of coupons and avails of the discounts on the current purchase.

Figure 13:
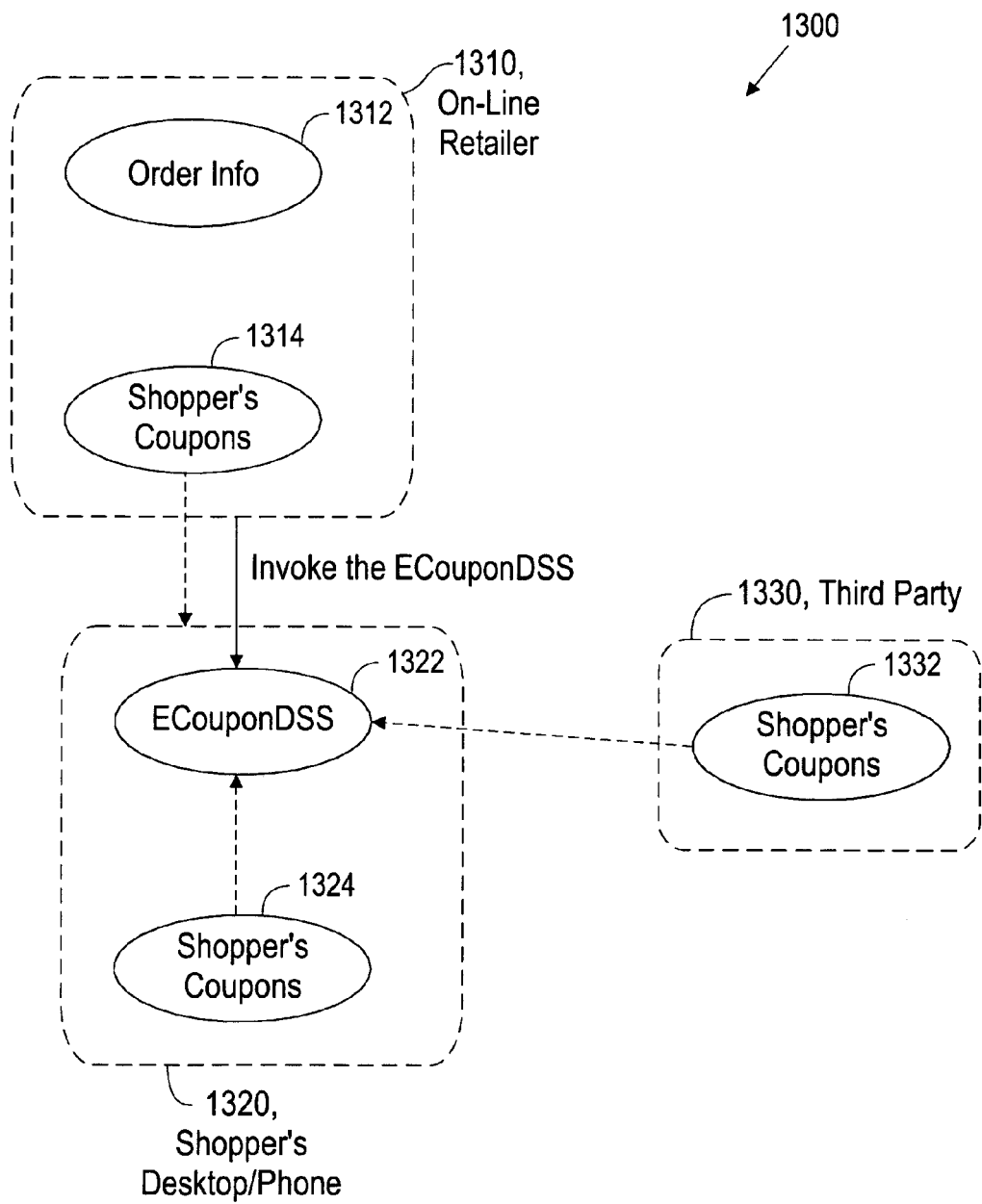
FIG. 13 is a block diagram illustrating an online coupon decision support system located at a local device and where the shopper's coupons are located at a retailer's site, a third party site, or a local device in accordance with the embodiments of the invention.

In a further embodiment of the invention, the ECouponDSS module 1322 is resident at a shopper's local device 1320 or as a browser's plugin as shown in FIG. 13. The shopper 1320 visits the online retailer site 1310, browses the site 1310, shops for certain items and chooses to redeem the shopper's coupons. This invokes the DSS 1322 with the order information 1312 as input from the retailer 1310. If the retailer has the shopper's coupons 1314, the retailer 1310 also sends the coupons 1314 as input to the DSS 1322. Otherwise, the DSS 1322 obtains the coupons 1332 from a third party site 1330 or the coupons 1332 the shopper's local device 1330. The shopper 1330 and the ECouponDSS module 1322 interactively select the set of coupons to use. The ECouponDSS module 1322 sends the coupons online to the retailer 1310 for redemption in the current purchase.

In still a further embodiment of the invention, the retailer may be off-line (i.e., a physical retailer). In this case, the shopper provides a list of items the shopper intends to purchase as an input to the ECouponDSS module. The ECouponDSS module obtains the coupons either from a third party or the shopper's local device. The shopper then interactively selects the set of coupons to use for the shopper's purchase, and prints these coupons on a printing device. The shopper carries the coupon printouts to a physical store to redeem these coupons intelligently.

5. Computer Implementation

The embodiments of the invention are preferably implemented using a general-purpose computer. In particular, the processing or functionality of FIGS. 1-13 can be implemented as software, or a computer program, executing on the computer. The method or process steps for e-coupon decision support and recommendation systems are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects advantageous e-coupon decision support and recommendation systems.

Figure 14:
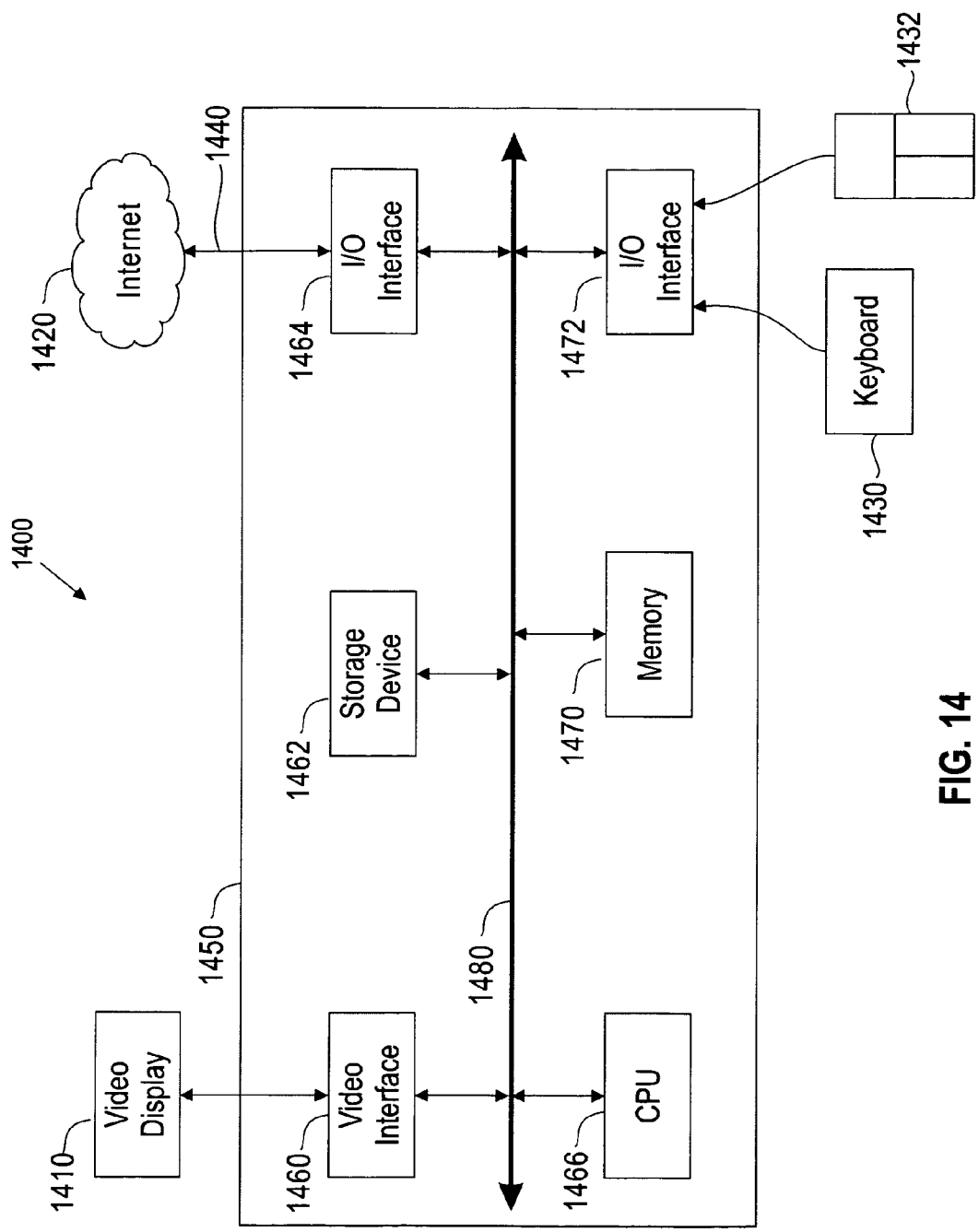
FIG. 14 is a block diagram of a general purpose computer with which embodiments of the invention can be practised.

Preferably, a computer system 1400 shown in FIG. 14 includes the computer 1450, a video display 1410, and input devices 1430, 1432. In addition, the computer system 1400 can have any of a number of other output devices including line printers, laser printers, plotters, and other reproduction devices connected to the computer 1450. The computer system 1400 can be connected to one or more other computers via a communication interface using an appropriate communication channel 1440 such as a modem communications path, a computer network, or the like. The computer network 1420 may include a local area network (LAN), a wide area network (WAN), an Intranet, and/or the Internet.

The computer 1400 itself preferably includes a central processing unit(s) 1466 (simply referred to as a processor hereinafter), a memory 1470 which may include random access memory (RAM) and read-only memory (ROM), input/ output (IO) interfaces 1464, 1472, a video interface 460, and one or more storage devices 1462. The storage device(s) 1462 can include one or more of the following: a floppy disc, a hard disc drive, a magneto-optical disc drive, CD-ROM, magnetic tape or any other of a number of non-volatile storage devices well known to those skilled in the art. Each of the components is typically connected to one or more of the other devices via a bus 1480 that in turn can consist of data, address, and control buses.

The video interface 1460 is connected to the video display 1410 and provides video signals from the computer for display on the video display 1410. User input to operate the computer can be provided by one or more input devices 1430, 1432. For example, an operator can use a keyboard 1430 and/or a pointing device such as the mouse 1432 to provide input to the computer.

The foregoing system is simply provided for illustrative purposes and other configurations can be employed without departing from the scope and spirit of the invention. Computers with which the embodiment can be practiced include IBM-PC/ATs or compatibles, one of the Macintosh (™) family of PCs, Sun Sparcstation (™), a workstation or the like. The foregoing are merely examples of the types of computers with which the embodiments of the invention may be practiced. Typically, the processes of the embodiments, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet 1420 and Intranets including email transmissions and information recorded on websites and the like. The foregoing are merely examples of relevant computer readable mediums. Other computer readable mediums may be practiced without departing from the scope and spirit of the invention.

In the foregoing manner, a method, an apparatus, and a computer program product for determining combinations of e-coupons and preferably providing suggestions or recommendations about those combinations to one or more users are disclosed. While only a small number of embodiments are described, it will be apparent to those skilled in the art in view of this disclosure that numerous changes and/or modifications can be made without departing from the scope and spirit of the invention.

We claim:

1. A computer-implemented method of making an optimized suggestion to a user regarding a combination of electronic coupons (e-coupons) for redemption by a retailer, said method comprising:

determining, by said computer, if a selection of e-coupons complies with redeeming conditions in relation to a purchase;

checking said selection of e-coupons complying with said redeeming conditions, by said computer, to determine mutually exclusive e-coupons of said selection of e-coupons applicable within said purchase, and to determine if two or more non-mutually exclusive e-coupons of said selection of e-coupons can be used in combination within said purchase;

defining optimization parameters by a user;

performing an optimization process, by said computer, on said selection of e-coupons to maximize a discount amount, a number of loyalty points, and a number of free items, by checking said selection of e-coupons complying with said redeeming conditions and capable of being used in combination within said purchase to determine if said selection of e-coupons satisfy said optimization parameters, said optimization process determining a most favorable combination of non-mutually exclusive e-coupons;

before said user makes said purchase, outputting a suggestion to said user, by said computer, displaying said most favorable combination of non-mutually exclusive e-coupons based on said determining said mutually exclusive e-coupons, said most favorable combination of non-mutually exclusive e-coupons comprising only said selection of e-coupons complying with said redeeming conditions and capable of being used in combination within said purchase;

saving said displayed most favorable combination of non-mutually exclusive e-coupons determined to comply with said redeeming conditions and capable of being used in combination within the same purchase and choosing another subset of said e-coupons;

choosing one of saved sets of e-coupons based on comparing two or more of said saved sets of e-coupons; and recommending to said user to use an additional e-coupon in relation to said purchase based on said choosing one of said saved sets of e-coupons.

2. The method according to claim 1, further including the step of selecting by a user said selection of e-coupons from a plurality of e-coupons.

3. The method according to claim 1, further including the step of providing a recommendation to a user regarding an additional purchase enabling said user to avail of more discounts.

4. The method according to claim 1, wherein said checking of said selection of e-coupons comprises checking e-coupons that reside at any one of the group consisting of a user's site, a third party's site, and a site of said retailer in said networked environment.

5. The method according to claim 1, wherein said networked environment is implemented utilizing one or more of the group consisting of the Internet, and Intranet, and Extranet, a local area network, an ATM network, a wide area network and a wireless network.

6. The method according to claim 1, wherein said optimization process is limited by parameters comprising which e-coupons should be included, an expiration date of said e-coupons, and a total number of e-coupons used.

7. A computer program product having a computer readable medium having a computer program recorded therein for making an optimized suggestion to a user regarding a combination of electronic coupons (e-coupons) for redemption by a retailer, said computer program product performing a method comprising:

determining if a selection of e-coupons complies with redeeming conditions in relation to a purchase;

checking said selection of e-coupons complying with said redeeming conditions to determine mutually exclusive e-coupons of said selection of e-coupons applicable within said purchase, and to determine if two or more non-mutually exclusive e-coupons of said selection of e-coupons can be used in combination within said purchase;

defining optimization parameters by a user;

performing an optimization process on said selection of e-coupons to maximize a discount amount, a number of loyalty points, and a number of free items, by checking said selection of e-coupons complying with said redeeming conditions and capable of being used in combination within said purchase to determine if said selection of e-coupons satisfy said optimization parameters, said optimization process determining a most favorable combination of non-mutually exclusive e-coupons;

before said user makes said purchase, outputting a suggestion to said user displaying said most favorable combination of non-mutually exclusive e-coupons based on said determining said mutually exclusive e-coupons, said most favorable combination of non-mutually exclusive e-coupons comprising only said selection of e-coupons complying with said redeeming conditions and capable of being used in combination within said purchase;

saving said displayed most favorable combination of non-mutually exclusive e-coupons determined to comply with said redeeming conditions and capable of being used in combination within the same purchase and choosing another subset of said e-coupons;

choosing one of saved sets of e-coupons based on comparing two or more of said saved sets of e-coupons; and recommending to said user to use an additional e-coupon in relation to said purchase based on said choosing one of said saved sets of e-coupons.

8. The computer program product according to claim 7, further including selecting by a user said selection of e-coupons from a plurality of e-coupons.

9. The computer program product according to claim 7, further including providing a recommendation to a user regarding an additional purchase enabling said user to avail of more discounts.

10. The computer program product according to claim 7, wherein said checking of said selection of e-coupons comprises checking e-coupons that reside at any one of the group consisting of a user's site, a third party's site, and a site of said retailer in said networked environment.

11. The computer program product according to claim 7 wherein said optimization process is limited by parameters comprising which e-coupons should be included, an expiration date of said e-coupons, and a total number of e-coupons used.

12. A computer-implemented method for electronic coupon (e-coupon) decision support, said method comprising:

computing, by said computer, a set of applicable e-coupons dependent upon a set of e-coupons of a user;

determining, by said computer, if said computed set of e-coupons complies with one or more redeeming conditions, which of said set of e-coupons are mutually exclusive within a same purchase and which of said set of e-coupons are non-mutually exclusive to be used in combination within the same purchase;

performing an optimization process, by said computer, on said selection of e-coupons to maximize a discount amount, a number of loyalty points, and a number of free items, by determining if said computed set of e-coupons determined to comply with said redeeming conditions and capable of being used in combination within the same purchase satisfy optimization parameters defined by said user, wherein said optimization parameters comprise at least one of a discount amount, loyalty points, a number of free items received, whether at least one particular e-coupon should be included, whether at least one particular e-coupon should not be included, expiration date, and a total number of e-coupons used, said optimization process determining a most favorable combination of non-mutually exclusive e-coupons;

before said user makes said purchase, outputting a suggestion to said user, by said computer, displaying said most favorable combination of non-mutually exclusive e-coupons based on said determining said mutually exclusive e-coupons, said most favorable combination of non-mutually exclusive e-coupons comprising only said computed set of e-coupons determined to comply with said redeeming conditions and capable of being used in combination within the same purchase that satisfy said optimization parameters;

saving said displayed, computed set of e-coupons determined to comply with said redeeming conditions and capable of being used in combination within the same purchase and choosing another subset of said e-coupons;

comparing by a user two or more saved sets of e-coupons and choosing one of saved sets of e-coupons; and recommending to said user to use an additional e-coupon in relation to said purchase based on said choosing one of said saved sets of e-coupons.

13. The method according to claim 12, wherein said computing step is also dependent upon order information.

14. The method according to claim 12, further including the steps of, if said computed set of e-coupons contains at least one e-coupon failing to comply with said redeeming conditions:

displaying said computed set of e-coupons; and enabling said user to select another set of e-coupons for use in said computing step.

15. The method according to claim 14, further including the step of:

displaying exclusive e-coupons in said another selected set of e-coupons to said user.

16. The method according to claim 15, further including the step of:

displaying e-coupons in said another selected set of e-coupon that are exclusive and fail to comply with said redeeming conditions to said user.

17. The method according to claim 12, further including the step of processing a purchase order for said displayed, computed set of e-coupons determined to comply with said redeeming conditions and capable of being used in combination within the same purchase.

18. The method according to claim 12, further including the step of recommending to said user a set of e-coupons determined to comply with said redeeming conditions and capable of being used in combination within the same purchase.

19. The method according to claim 12, further including the step of a user viewing reports of e-coupon usage statistics and savings.

20. The method according to claim 12, wherein said finding step is implemented using an optimization engine, said optimization engine addressing one or more conditions selected from the group consisting of:

an AND condition among product purchase redemption conditions;

an AND condition among category purchase redemption conditions;

an XOR condition among product purchase redemption conditions;

an XOR condition among category purchase redemption conditions; and an e-coupon purchase condition on total amount and e-coupons with heterogeneous purchase conditions.

21. The method according to claim 12, further including the step of:

providing recommendations to said user, based on a profile of said user, in relation to a user selected set of e-coupons.

22. The method according to claim 12, wherein said computing of said set of applicable e-coupons comprises computing e-coupons that reside at any one of the group consisting of a user's site, a third party's site, and a site of said retailer in said networked environment.

23. A computer program product having a non-transitory computer readable medium having a computer program recorded therein for electronic coupon (e-coupon) decision support, said computer program product including:

computing a set of applicable e-coupons dependent upon a set of e-coupons of a user;

determining if said computed set of e-coupons complies with one or more redeeming conditions, which of said set of e-coupons are mutually exclusive within a same purchase and which of said set of e-coupons are non-mutually exclusive to be used in combination within the same purchase;

performing an optimization process on said selection of e-coupons to maximize a discount amount, a number of loyalty points, and a number of free items, by determining if said computed set of e-coupons determined to comply with said redeeming conditions and capable of being used in combination within the same purchase satisfy optimization parameters defined by said user, wherein said optimization parameters comprise at least one of a discount amount, loyalty points, a number of free items received, whether at least one particular e-coupon should be included, whether at least one particular e-coupon should not be included, expiration date, and a total number of e-coupons used, said optimization process determining a most favorable combination of non-mutually exclusive e-coupons;

before said user makes a purchase, outputting a suggestion to said user displaying said most favorable combination of non-mutually exclusive e-coupons based on said determining said mutually exclusive e-coupons, said most favorable combination of non-mutually exclusive e-coupons comprising only said computed set of e-coupons determined to comply with said redeeming conditions and capable of being used in combination within the same purchase that satisfy said optimization parameters;

saving said displayed, computed set of e-coupons determined to comply with said redeeming conditions and capable of being used in combination within the same purchase and choosing another subset of said e-coupons;

comparing by a user two or more saved sets of e-coupons;

choosing one of said saved sets of e-coupons; and recommending to said user to use an additional e-coupon in relation to said purchase based on said choosing one of said saved sets of e-coupons.

24. The computer program product according to claim 23, wherein said computing is also dependent upon order information.

25. The computer program product according to claim 23, further including, if said computed set of e-coupons contains at least one e-coupon failing to comply with said redeeming conditions:

displaying said computed set of e-coupons; and enabling said user to select another set of e-coupons for use in said computing step.

26. The computer program product according to claim 25, further including displaying exclusive e-coupons in said another selected set of e-coupons to said user.

27. The computer program product according to claim 26, further including displaying e-coupons in said another selected set of e-coupons that are exclusive and fail to comply with said redeeming conditions to said user.

28. The computer program product according to claim 23, further including processing a purchase order for said displayed, computed set of e-coupons determined to comply with said redeeming conditions and capable of being used in combination within the same purchase.

29. The computer program product according to claim 23, further including recommending to said user a set of e-coupons determined to comply with said redeeming conditions and capable of being used in combination within the same purchase.

30. The computer program product according to claim 23, wherein said finding is implemented using an optimization engine, said optimization engine addressing one or more conditions selected from the group consisting of:

an AND condition among product purchase redemption conditions;

an AND condition among category purchase redemption conditions;

an XOR condition among product purchase redemption conditions;

an XOR condition among category purchase redemption conditions; and an e-coupon purchase condition on total amount and e-coupons with heterogeneous purchase conditions.

31. The computer program product according to claim 23, further including:

providing recommendations to said user, based on said user's profile, in relation to a user selected set of e-coupons.

32. The computer program product according to claim 23, wherein said computing of said set of applicable e-coupons comprises computing e-coupons that reside at any one of the group consisting of a user's site, a third party's site, and a site of said retailer in said networked environment.

33. An electronic coupon (e-coupon) decision support system for making an optimized suggestion to a user regarding a combination of electronic coupons (e-coupons) for redemption by a retailer, said system including:

a hardware module adapted to:

compute a set of applicable e-coupons dependent upon a set of e-coupons of a user;

determine if said computed set of e-coupons complies with one or more redeeming conditions, which of said set of e-coupons are mutually exclusive within a same purchase and which of said set of e-coupons are non-mutually exclusive to be used in combination within the same purchase; and display only said computed set of e-coupons determined to comply with said redeeming conditions and capable of being used in combination within the same purchase;

an optimization engine adapted to perform an optimization process on said selection of e-coupons to maximize a discount amount, a number of loyalty points, and a number of free items, by determining a subset of e-coupons from said computed set of e-coupons determined to comply with said redeeming conditions and capable of being used in combination within the same purchase, to determine a most favorable combination of non-mutually exclusive e-coupons; and a user interface adapted to output a suggestion to said user displaying said most favorable combination of non-mutually exclusive e-coupons based on said determining said mutually exclusive e-coupons, said most favorable combination of non-mutually exclusive e-coupons before said user makes said purchase; and a storage device adapted to save said displayed most favorable combination of non-mutually exclusive e-coupons determined to comply with said redeeming conditions and capable of being used in combination within the same purchase and choosing another subset of said e-coupons, wherein one of saved sets of e-coupons is chosen based on comparing two or more of said saved sets of e-coupons, wherein said user interface communicates a recommendation to said user to use an additional e-coupon in relation to said purchase based on said choosing one of said saved sets of e-coupons.

34. The system according to claim 33, further including:

a recommendation engine for providing recommendations regarding one or more further purchases to a user, based on said user's profile, after said user has selected a set of e-coupons to use.

35. The system according to claim 33, wherein said hardware module, said software module, and said optimization engine are adapted to analyze e-coupons that are located at a retailer's site, a user's site, or a third party site in a network.

36. The system according to claim 33, wherein said optimization engine is limited by parameters comprising which e-coupons should be included, an expiration date of said e-coupons, and a total number of e-coupons used.

* * * * *